United States Patent [19]

Keane

[11] 4,385,615

[45] May 31, 1983

[54] FUEL SYSTEM FOR DIESEL ENGINES

[75] Inventor: Robert S. Keane, Orange, Calif.

[73] Assignee: Fuel Dimensions, Inc., Anaheim, Calif.

[21] Appl. No.: 82,419

[22] Filed: Oct. 5, 1979

[51] Int. Cl.³ .............................................. F02M 37/00
[52] U.S. Cl. .................................... 123/514; 123/516; 123/557
[58] Field of Search ............... 123/514, 516, 525, 527, 123/557, 541, 25 E, 25 F

[56] References Cited

U.S. PATENT DOCUMENTS 2,599,699  6/1952  Dilworth .............................. 123/514
4,175,527  11/1979  Sanada ................................. 123/514
4,343,283  8/1982  Shepherd ............................. 123/514

FOREIGN PATENT DOCUMENTS 3017325  11/1980  Fed. Rep. of Germany ...... 123/514

Primary Examiner—Ronald H. Lazarus
Attorney, Agent, or Firm—Willie Krawitz

[57] ABSTRACT

Fuel for a diesel engine is fed to the engine through a small float tank provided with a fuel heater. A cooling unit is employed to cool overheated fuel recycled from the engine. A temperature controlled valve is utilized to divert recycled fuel from the cooling unit through the float tank and back to the engine if the recycled fuel is sufficiently cool. The fuel heater, cooling unit and valve are adapted to optimize fuel temperature based on engine performance design.

Water, propane, LPG, etc. also may be injected into the engine along with the diesel fuel to improve the combustion process and fuel economies.

14 Claims, 5 Drawing Figures

FUEL SYSTEM FOR DIESEL ENGINES

BACKGROUND OF THE INVENTION

This invention relates to a new and improved fuel feed system for diesel engines, and more specifically, to a fuel feed system which supplies fuel to the engine at controlled temperatures to improve engine performance. Water, LPG and alcohol injection may be utilized to reduce fuel consumption, lower $NO_x$ emissions and reduce engine deposits.

Various problems are encountered when starting or operating large diesel truck engines in cold weather, a principle one being the use of cold fuel. Usually, the fuel must be pre-heated and this is both time consuming and expensive.

These problems have become somewhat more aggravated in recent years due to the increased use of higher boiling point wax fractions in the fuel. These wax fractions tend to crystallize out in engine parts and fuel lines more readily in cold weather and make starting and operating even more difficult.

In addition to starting problems, diesel engines are designed for optimum performance using fuel within a certain temperature range. For example, typical Cummins engines operate best with fuel in the temperature range of about 94° F. to 104° F. and it is most important that the fuel temperature be controlled to within this range at all times. Hence, in the summer, the fuel should be cooled down to about 94° F., while in the winter, the fuel should be heated in excess of about 94° F. Accordingly, if the engine fuel runs too cold or too hot, performance will be impaired because the feed rates for fuel and air are optimized when operating within the above temperature range. Thus, during cold starting, it is obviously important to employ a warm or hot fuel depending on ambient temperature. On the other hand, after running temperatures are attained, it may be preferable to supply the fuel at cooler temperatures, particularly if the engine is running in an excessively hot ambient temperature.

Normally, part of the cooling in a diesel engine is accomplished via fuel returned to the main fuel tank; the returned fuel represents about three times the fuel actually burned. However, when the ambient temperature exceeds about 100° F., the main fuel tank temperature may approach about 180° F. which is nearly at the engine running temperature.

It has been found that a fuel density decrease due to a temperature increase will cause a 1% decrease in horsepower for each 10° F. rise in fuel temperature above about 94° F. Hence, if the engine temperature is 180° F., and the fuel tank temperature is, say, 160° F., the horsepower loss is approximately 7.5% depending on the fuel density curve. Conversely, if the ambient temperature is too cold, the return fuel will not heat the fuel tank to 94° F.; this will cause the fuel density to increase and exceed the air supply to the engine intake. Consequently, the fuel supply will be too rich, causing poor combustion characteristics and carbon deposits to form. Overall, fuel atomization of the fuel injection is optimized when the fuel at the inlet pump is about 94° F.–104° F. and the engine temperature is a constant 180° F.

One solution for effectively controlling fuel temperature to accommodate rapidly changing engine conditions caused by ambient temperature, engine load and traffic conditions would be to heat or cool the fuel tank. However, this would require excessive power in the case of heating, and is impractical in the case of cooling.

While earlier engines were low powered with a large number of gear shiftings to accommodate for various speeds, loads, grades, etc., the newer diesel engines have a greater horsepower at lower rpm and fewer gear shiftings. This in turn enables faster trip times and hence a more economical operation. However, these newer engines are more sensitive to fuel temperature control in order to achieve their maximum design performance, and the increased cost of fuel has reduced their economic gains.

The desire for water injection or supplemental fuel injection into the engine air intake manifold has known desireable effects such as increased power, but adequate delivery systems for fuel and water have proven unsuitable, and a satisfactory temperature control system for fuel has not been developed.

THE INVENTION

According to the invention, a temperature controlled fuel feeding system for a diesel engine is provided comprising: a main fuel supply tank and pumping means therefor; a float tank fed from the main fuel tank for providing fuel to the engine at a controlled temperature; heating means associated with the float tank; means for returning the cooled fuel to the float tank; and, means to adjust the float tank temperature thereby feeding fuel to adjust the float tank temperature thereby feeding fuel to the engine within a suitable temperature range.

During engine start-up, say in cold weather, fuel from the main fuel supply is pumped to the float tank, heated, and then fed to the cold engine; return fuel directed to the float tank will further heat incoming fuel. When the engine has reached its operating temperature, heating of the float tank, such as by an electrical element may be discontinued. Conversely, if the ambient temperature is excessively hot, it may be advisable to cool the fuel prior to use by the engine. This is accomplished by passing recycled hot fuel from the engine through a cooling system such as a water or air cooler, and directing the cooled fuel through the float tank and back into the engine. In conjunction with the usual air cooling fans, use of cooled fuel in a hot or overheated engine is obviously quite beneficial since it is applied directly to the engine components and also conforms to engine design criteria for fuel temperatures.

As an optional consideration, running fuel consumption (i.e. flow rate) may be indicated by means of, say, a digital LED display for viewing by the vehicle operator. Total fuel consumption may be displayed remotely from the operator to provide an independent check of fuel consumption for trip recording and fuel mileage computation.

The invention also enables use of a pneumatically driven fuel totalizer counter activated by means of the fuel supply pump during operation of the system; this provides a mechanical counter record of fuel consumption. The counter may be locked and secured for surveillance purposes to provide a record of fuel consumed for fuel tax computation. Thus, trucks equipped with power take-off devices used for unloading, drilling, etc., may utilize a record of fuel consumed during off-road operations and deduct the tax payable from road tax assessments.

DESCRIPTION OF THE PREFERRED EMBODIMENT

Figure 2:
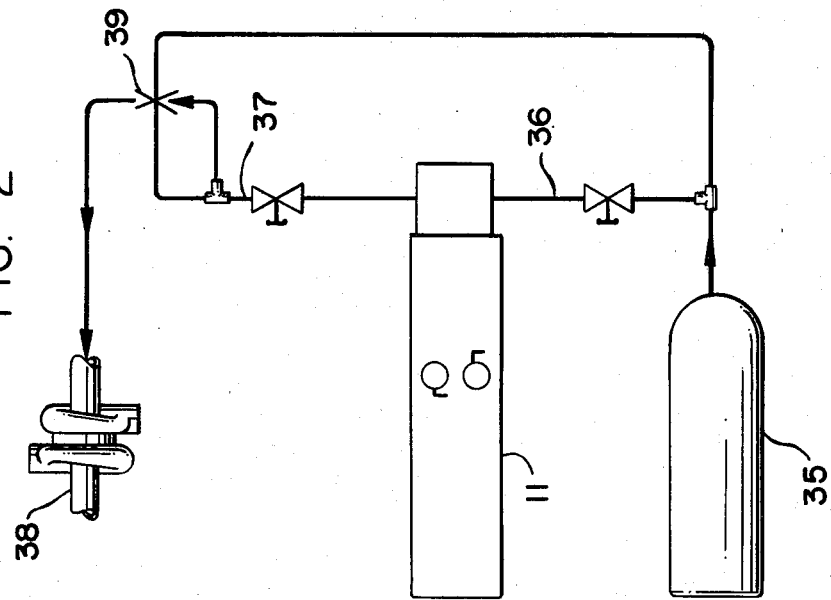
FIGS. 1 and 2 are schematic representations showing the temperature controlled fuel feed system of this invention.
Figure 1:
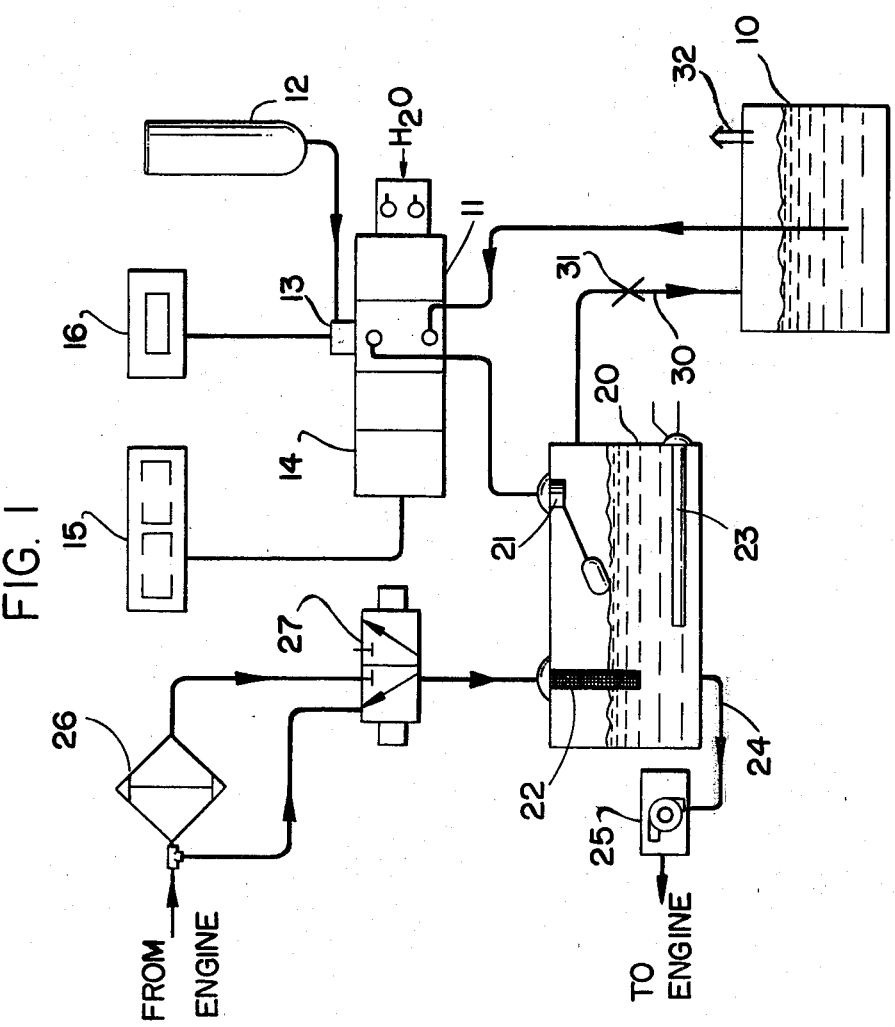

FIGS. 1 and 2 show the fuel temperature control system of this invention, comprising a main fuel supply tank 10 driven by a pneumatic pump 11 which is powered from an air supply 12 operated at about 15-25 psi. A preferred type of pump is disclosed in a United States Patent application by Robert S. Keane, entitled "PUMP FOR FLUIDS", filed on Oct. 5, 1979 as U.S. Ser. No. 082,416 now abandoned.

Fuel sensors 13, 14 driven by the pump 11 actuate an LED display 15 and a pneumatic totalizer 16. The LED provides a running total of fuel consumed en route and is used by the driver for calculations of round trip or single trip fuel consumption. The pneumatic totalizer 16 is a forever total which functions as a double check on the LED and also as a continuing indication of engine performance.

Fuel from the main fuel tank is pumped on a demand basis, both from the standpoint of power and temperature, and mixed with unburned fuel recycled from the engine. Mixing of the recycled fuel from the engine with fuel from the fuel tank occurs in a float tank 20 provided with a positive shut off float control 21, a screen fuel defoaming element 22 and an electric immersion heater 23; an outlet line 24 leads to an engine fuel pump 25 which feeds the diesel engine.

The engine fuel pump is maintained at about the same level as the float tank, and this elevation imparts a positive suction pressure to the fuel pump. This in turn relieves suction pressure on the fuel pump inlet shaft seals and reduces the potential intrusion of air through these seals to the fuel. Normally, air bubbles entrained in the fuel are compressed in the gear mechanism of the fuel pump and this causes localized heat and decomposition of fuel in the immediate vicinity. Also, cavitation effects of the air causes excessive wear in the fuel pump mechanism and in the engine injector when the air-entrained fuel is compressed into the combustion chamber. Finally, if compressed, air-entrained fuel exceeds the ignition temperature in localized portions of the fuel injector, premature ignition will result; this in turn affects the timing of the fuel injection-ignition system which reduces overall power. However, when the float tank 20 is positioned at about the same level as the fuel pump 25, problems arising from air bubble entrainment in the fuel are reduced.

Upwardly of the float tank 20 is a fuel cooling unit 26 through which hot fuel is passed after recycling from the engine. A heat control valve 27 is employed to either admit recycled fuel directly to the float tank 20, or to initially feed the recycled fuel to the cooling unit 26 and then to the float tank. A valve temperature setting of about 100° F. will determine whether the recycled fuel is fed directly to the float tank 20, or first to the cooling unit 26. A pressure regulator (not shown) between the float 21 and the pump 11 provides float accuracy.

A return line 30 and relief valve 31 lead from the float tank to the fuel tank 10 having a gas relief vent 32. Exhaust gases which become entrained in the fuel and are recycled back to the float tank 20, are vented through the return line to the fuel supply tank 10, and are then vented again through the relief vent 32.

Preferably, the float tank volume is about 3⅓% of the amount returned to the float tank. Typically, for a consumption of 20 gallons/hr, a return rate of 60 gallons/hr will occur, and this will require a float tank volume of approximately two gallons.

Water or fuel additive injection is illustrated in FIG. 2, and comprises a water supply tank 35 (or propane, butane, LPG, etc. in the case of a fuel additive) connected to the pump 11 through a line 36. This feeds directly via a line 37 into the intake or discharge of an engine supercharger 38. A back pressure compensator valve 39 is provided to maintain the propane in the liquid state at varying ambient temperature. After the water or fuel additive is fed to the combustion chamber of the engine, it is heated or consumed through an exhaust. When using water, a mixture of about 80% water-20% methanol may be employed to minimize freezing problems; however, the use of methanol is optional. Water injection when utilized, is based on fuel flow and employs about 20%-50% (preferably about 30%) water by weight of total fuel.

Since the water injector is directly connected to the fuel metering pump, if the piston volume of the pump is approximately 20%-30% of the fuel piston volume, the percentage of water injected will equal the ratio of the two piston volumes (i.e. 20%-30%). Exact ratios are required for injection of water or fuel to the intake system of the engine to obtain the desired increase in performance and efficiency. A pre-determined ratio is obtained by sizing the water injector piston diameter to equal a percentage volume of the fuel displaced on a volume basis. An accurate accounting of fuel or water is thus obtained by computing a direct percentage of fuel consumed to additive injected.

Attempts have been made in the past to employ emulsifying techniques to combine the fuel and water prior to injection into the engine, but they have not been successful. The present system avoids problems associated with emulsification. It also eliminates foaming and problems caused by dissolved gases such as air and combustion gases in the fuel.

Water injection improves power by about 5%-10% without engine life detriment and, in addition, carbon deposits are reduced. Also, hot spots are reduced, and this improves anti-knock performance. Furthermore, water injection improves combustion by providing a more uniform flame front in the combustion process. The effects are somewhat analagous to the use of tetraethyl lead additives in gasoline. The water vapor reduces temperature transients during heat of compression and during ignition, and produces controlled combustion for maximum power output.

Supplemental fuels may be injected into the diesel engine in the same manner as water injection to improve combustion characteristics which includes stabilizing propagation of the flame front during firing. These fuels, all in the liquid phase, include LPG, lower hydrocarbons such as propane, butanes, pentanes, corresponding unsaturated hydrocarbons and alcohols, etc.; improved horsepower performance, by about 32%-42% on a vol./vol. basis is thus obtained. The supplemental fuels exhibit better resistance to detonation than diesel fuels and comprise about 20%-90% by weight of the diesel fuel which they are mixed. For optimized fuel utilization, however, a more preferable concentration of these supplemental fuels varies from about 32%-42% by weight of the diesel fuels. But if diesel fuels become less available, ratios higher than, say, 42% may be employed.

Supplemental fuel injection occurs in the intake manifold downstream of the supercharger during the intake stroke. A lean mixture of about 50-60 parts by weight of air to 1 part of propane stabilizes the flame front propagation in a manner similar to the use of water injection in the combustion process; the overall effect in the diesel engine is to increase horsepower and fuel mileage. Also, when the propane, butanes, LPG, alcohols, etc. are vaporized at the supercharger discharge port, this requires vaporization energy, and hence produces a cooling effect of air in the intake manifold. The consequent reduction of air temperature increases air density and increases the amount of air available for the eventual and more complete combustion of the supplemental fuel with diesel fuels.

Figure 3:
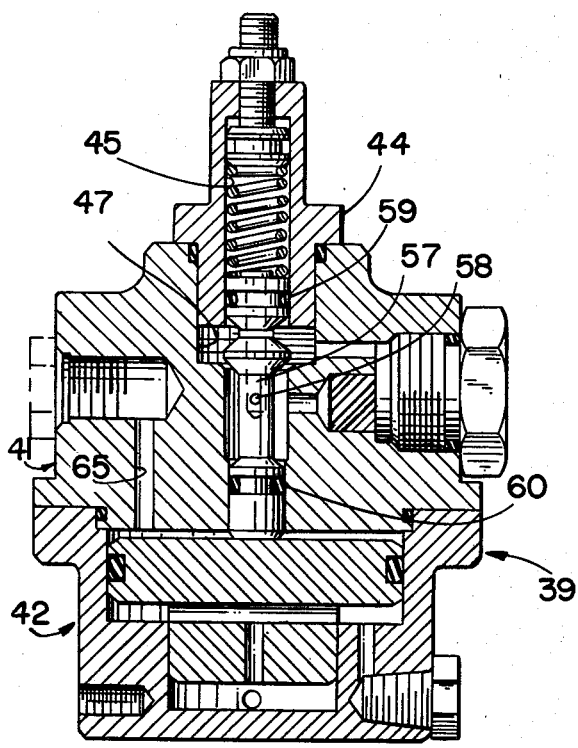
FIGS. 3 and 4 are views in sectional side elevation showing a back pressure compensator valve employed in the fuel feed system; and, FIG. 5 shows a side elevation view, partly in section, of a float regulator used in the fuel feed system.
Figure 4:
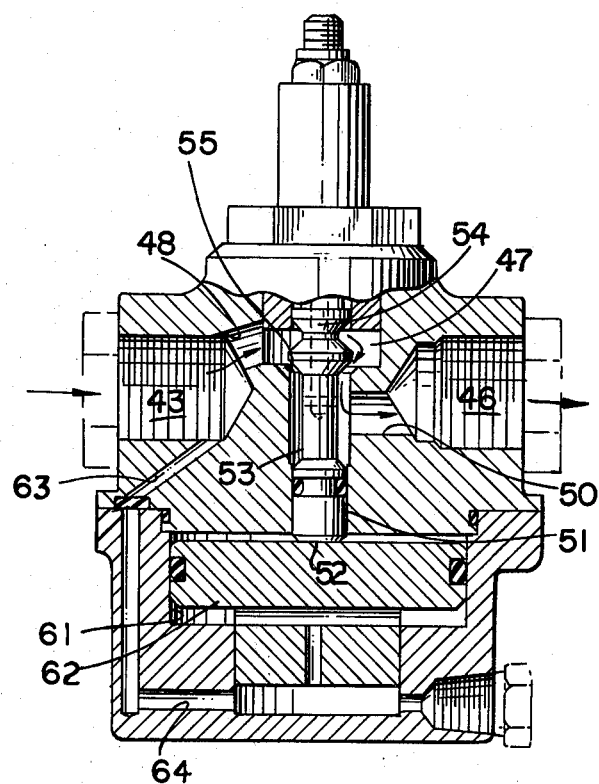

The back pressure compensating valve 39 is shown in greater detail in FIGS. 3 and 4. The valve includes a poppet housing 41 mounted on a piston body 42. The poppet housing provides an inlet port 43, a poppet housing 44, a spring poppet chamber 45, and an outlet port 46. An inlet space 47 of the poppet communicates to the inlet port 43 via a channel 48 and outlets to the outlet port 46 via a channel 50. A piston chamber 51 containing a drive piston 52 is located underneath and in axial alignment with the poppet chamber. An adjustable, spring loaded, vertically actuable poppet 53 having a conical face wing valve 54 is positioned within the spring poppet chamber 45 and is shown in an unseated position from its seat 55. Hence, if a supplemental liquid is fed from the inlet port 43, it will pass around the poppet to the outlet port 46 in the direction shown by the arrows. The interior of the valve provides a stem 57 with an orifice 58 at its lower end; at its upper end, the stem is open to the poppet spring chamber 45. The valve is sealed at each end by seals 59, 60. Consequently, any vapor pressure back from the outlet will enter the orifice 58 and into the spring chamber 45; this will pressure the valve downwardly and maintain it in the closed position.

The piston body 42 includes a piston chamber 61 having a vertically movable piston 62 in the piston body connected from the inlet port to the underside of the piston chamber 61.

When vapor from the propane tank is supplied at ambient conditions to the inlet, it will pressure the upper portion of the piston through channel 65. Simultaneously, the liquid propane is fed through channels 63 and 64 at an equal pressure and bears upwardly against the underside of the piston. However, in the absence of pumping pressure, the piston will not move because the balance of forces is equal. When pumping pressure is applied to the liquid propane, it will be forced upwardly against the piston 62 and will unseat the poppet when the pump pressure exceeds the poppet spring pressure by a fixed amount, e.g. 10-50 psi. The net effect is that propane is supplied to the engine on the basis of fuel requirements, independently of temperature induced pressure changes within the propane tank.

Figure 5:
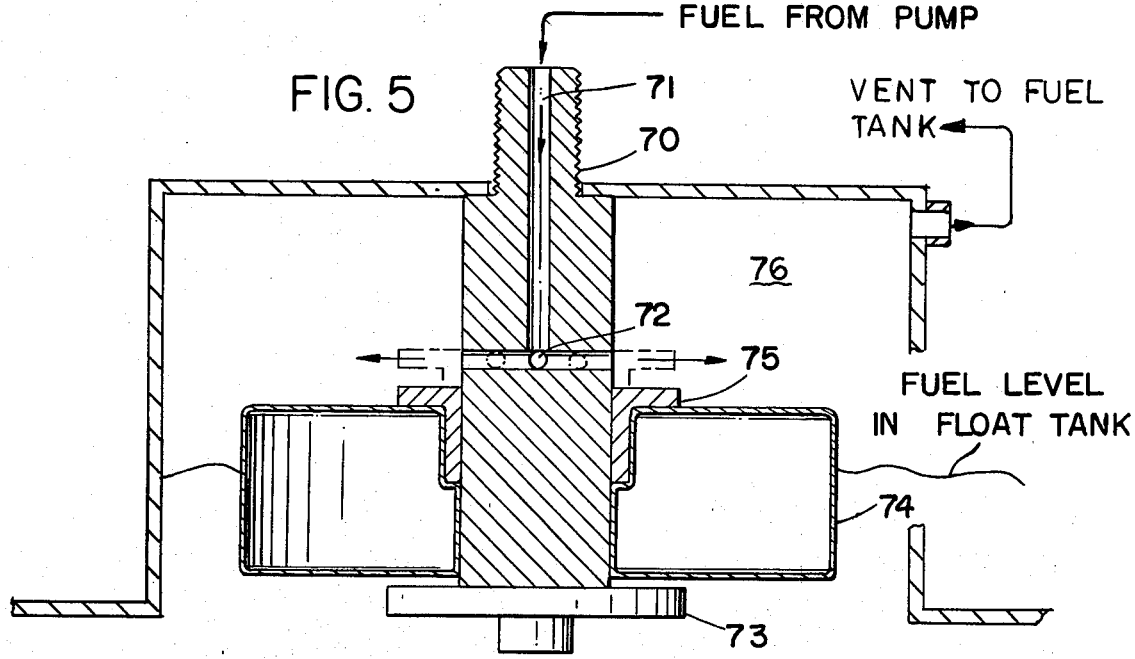

Another embodiment of a float control for the float tank 20 is shown in FIG. 5. The float control is attached to the tank by a threaded portion 70 having an inlet bore 71 through which fuel is pumped. The inlet bore feeds a plurality of peripheral fuel outlets 72 and then into the float tank. A retainer portion 73 is provided at the bottom of the float control, and a vertically movable, hollow float 74 rests on the retainer and moves vertically along the float control depending on the fuel level in the tank. A machined collar 75 having a close tolerance fit with the float control is mounted on the float 74. When the fuel level in the float tank rises, the float will rise and the collar 75 will eventually cut off the fuel outlets. The float is placed into a small confined area 76 of the tank so that changes in the fuel level of the tank as a whole will cause an immediate response of the float in its area, much like a float in a carburetor. This float system can also be utilized to determine the tank fluid level very accurately such when it is desired to fill a tank at the same level repeatedly, and where sight gauges cannot be feasibly employed. This type of control represents the preferred embodiment since it has a very fast response time and is practically immune to fuel oscillations in the float tank due to bumping, etc.

The improved horsepower performance by propane injection into the diesel intake system is quite surprising in that it produces a marked increase in horsepower, particularly on a 1:1 basis relative to the diesel fuel. Inasmuch as diesel fuel contains about 140,000 BTU/gal, and propane contains only about 85,000 BTU/gal, it would be expected that the two fuels would produce a weighted average in BTU content. The obvious synergism in BTU content when the two fuels are combined is due partly to the fuel content of the propane in that its latent heat of vaporization causes the intake air to cool, thereby increasing the net air flow. The synergism is also due to improvement in the combustion process manifested by increased heat-work on the piston and subsequent lower exhaust temperatures; this latter effect reduces $NO_x$ emissions and improves engine component life.

I claim:
1. A fuel system for a diesel engine, comprising:
I. a diesel engine, including a fuel inlet;
II. fuel input means for the diesel engine, including:
 (a.) a main fuel supply tank;
 (b.) a float tank connected to the main supply tank, the float tank including:
  i. heating means adapted to heat fuel within the float tank;
  ii. a float control adapted to maintain a suitable fuel level within the float tank;
 (c.) a supplementary fuel tank connected to the diesel engine;
 (d.) a feed pump adapted to drive fuel from the main fuel supply tank to the float tank and feed supplementary fuel from the supplementary fuel tank to the engine in an amount proportional to the feed pump rate; and,
 (e.) an engine pump for feeding fuel from the float tank to the fuel inlet of the diesel engine;
III. fuel recycling means, including:
 (a.) a return line from the engine;
 (b.) a cooler connected to the return line;
 (c.) cooling means within the cooler; and,
 (d.) temperature responsive valve means disposed on the return line, the valve being connected to the cooler and the float tank and being responsive to the temperature of the fuel; whereby,
A. cold fuel recycled from the engine is:
  i. diverted by the valve to the float tank,
  ii. mixed with incoming fuel from the main supply tank; and,
  iii. the mixed fuel is heated by the heating means and then fed from the float tank to the fuel inlet of the engine;
B. hot fuel recycled from the engine is:
  i. diverted by the valve to the cooler;
  ii. cooled by the cooling means;
  iii. forwarded to the float tank; and,
  iv. the cooled fuel is mixed with incoming fuel from the main supply tank, and then fed from the float tank to the fuel inlet of the engine;
C. fuel recycled from the engine at operating temperature is:
  i. diverted by the valve to the float tank;
  ii. mixed with incoming fuel from the main supply tank; and,
  iii. the mixed fuel is fed from the float tank to the engine inlet; and,
D. fuel is fed from the supplementary fuel tank to the engine to improve combustion characteristics.

2. The fuel injection system of claim 1 in which about 20%–90% by weight of supplemental fuel is injected into the diesel engine based on diesel fuel weight.

3. The fuel injection system of claim 1 in which the float tank and engine fuel pump are at about the same level.

4. The fuel injection system of claim 1 comprising valve means for by-passing recycled fuel from the (cooling unit) cooler to the float tank when the recycled fuel is at a temperature less than about 100° F.

5. The fuel injection system of claim 1 in which the float tank defines a volume about $3\frac{1}{3}\%$ of the amount of the fuel flow return to the fuel supply tank.

6. The fuel injection system of claim 1 in which the float tank heating means is adapted to be actuated at a fuel temperature less than about 45° F.

7. The fuel injection system of claim 1 in which the cooling means is adapted to cool the recycled fuel from about 140° F.–150° F. to about 94° F.–104° F.

8. The fuel injection system of claim 1, in which the heating means is adapted to heat the fuel to about 45° F.–70° F.

9. The fuel injection system of claim 1 providing metering means for the fuel supplied from the fuel supply tank and an air-powered, demand feed pump for pumping fuel from the fuel supply tank.

10. The fuel injection system of claim 1, comprising gas venting means from the float tank to the main fuel supply tank, and gas venting means from the main supply tank to atmosphere.

11. The fuel injection system of claim 1, in which the supplemental fuel is propane.

12. The fuel injection system of claim 11, in which equal amounts of propane and diesel fuel are supplied to the diesel engine.

13. The fuel injection system of claim 1, comprising a float control valve, including:
  (a.) a fuel inlet pipe having upper and lower ends, the upper end extending vertically into the float tank, and the lower end extending into the fuel;
  (b.) a plurality of fuel outlet bores extending peripherally of the pipe;
  (c.) a retainer portion mounted on the pipe at its lower end;
  (d.) a float portion adapted to float in the fuel and movable along the pipe in response to varying fuel levels, the float being positioned upwardly of the retainer portion, and being constrained on the pipe thereby; and,
  (e.) a machined collar carried by the float and mounted along the pipe for close sliding contact therewith, the collar being adapted to occlude the outlet bores and cut off the flow of fuel from the bores when the fuel in the tank reaches a predetermined level.

14. The fuel injection system of claim 13, in which the float is positioned within a confined area of the tank.

* * * * *